Patented Oct. 14, 1930

1,778,239

UNITED STATES PATENT OFFICE

WALLACE J. YATES, OF MARTINEZ, CALIFORNIA, ASSIGNOR TO SHELL DEVELOPMENT COMPANY, OF SAN FRANCISCO, CALIFORNIA, A CORPORATION OF DELAWARE

SPRAY OIL

No Drawing. Application filed May 15, 1929. Serial No. 363,405.

My invention consists in improving spray oils used as insecticides by the addition of small quantities of naphthylamine to prevent injury to the vegetation.

I have observed that spray oils, as commonly used for the protection of plants and trees, particularly fruit trees, against certain insects, very often cause injury to the vegetation, especially the less refined oils; twig injury, leaf burn, fruit burn, increase of fruit or leaf drop and crop reduction often follow the spraying with insecticidal oils.

I have found that the addition of small amounts of naphthylamine to the oil before the spraying will usually prevent, or in any case, reduce this injury, as well with summer or foliage spray oils, as with less refined winter or dormant spray oils. Both the alpha and the beta naphthylamines give good results, not more than 1% by weight on the oil being needed; usually about ½% will be sufficient, depending largely on the degree of refinement of the oil. The addition hereof according to my invention can be used either to increase the safety of a given oil, or for reducing the degree of refinement formerly necessary to spray certain plants with safety; it does not materially affect the insecticidal value of the oil.

Both these naphthylamines are quite soluble in oil, so that their incorporation in the spray oil presents no difficulties. Preferably, I dissolve them in the oil, before preparing the spray oil emulsion in water. They do not have to be absolutely pure, the commercial product is sufficient for my purpose.

I have further found that the naphthylamines also reduce the injury caused by the addition of nicotine and similar insecticidal substances to the spray oil; such oils with added nicotine cause injury similar to that caused by the same oil without the addition of nicotine, but to a greater extent, and this increased injury is also counteracted by my invention.

I claim as my invention:

1. An improved spray oil, comprising: a small quantity of naphthylamine.

2. As an insecticidal substance, a petroleum spray oil, in which a small quantity of naphthylamine has been dissolved.

3. A spraying liquid for insecticidal purposes: an emulsion in water of a petroleum spray oil to which a small quantity of naphthylamine has been added.

4. An improved spray oil, comprising: not over 1% by volume of naphthylamine.

5. A process for preventing injury to vegetation from petroleum spray oil, comprising: adding to the oil before the spraying a small quantity of naphthylamine.

6. A process for improving a spray oil in which nicotine has been incorporated, comprising: adding to the oil before the spraying a small quantity of naphthylamine.

In testimony whereof, I have hereunto set my hand.

WALLACE J. YATES.